US008254640B2

(12) United States Patent
Ma

(10) Patent No.: US 8,254,640 B2
(45) Date of Patent: *Aug. 28, 2012

(54) AUTOMATIC AGE CLASSIFICATION OF FOREST LANDS

(75) Inventor: Zhenkui Ma, Kent, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,099

(22) Filed: Oct. 13, 2011

(65) Prior Publication Data

US 2012/0033878 A1 Feb. 9, 2012

Related U.S. Application Data

(63) Continuation of application No. 12/343,930, filed on Dec. 24, 2008, now Pat. No. 8,064,692.

(51) Int. Cl.
*G06K 9/00* (2006.01)
(52) U.S. Cl. ...................................................... 382/110
(58) Field of Classification Search .................. 382/100, 382/110
See application file for complete search history.

(56) References Cited

U.S. PATENT DOCUMENTS

| | | | |
|---|---|---|---|
| 5,341,439 A | | 8/1994 | Hsu |
| 5,886,662 A | * | 3/1999 | Johnson ...................... 342/25 A |
| 7,130,465 B2 | * | 10/2006 | Muenzenmayer et al. ... 382/190 |
| 7,212,670 B1 | * | 5/2007 | Rousselle et al. ............. 382/173 |
| 7,218,776 B2 | | 5/2007 | Sowinski |
| 2002/0113212 A1 | | 8/2002 | Meglen |
| 2007/0291994 A1 | * | 12/2007 | Kelle et al. ..................... 382/110 |
| 2011/0110562 A1 | * | 5/2011 | Kelle et al. ..................... 382/110 |

OTHER PUBLICATIONS

Champion, I., et al., "Radar Image Texture as a Function of Forest Stand Age," International Journal of Remote Sensing 29(6):1795-1800, Mar. 2008.
Drezet, P.M.L., and S. Quegan, "Satellite-Based Radar Mapping of British Forest Age and Net Ecosystem Exchange Using ERS Tandem Coherence," Forest Ecology and Management 238(1-3):65-80, Jan. 2007.
Franklin, S.E. et al., "Discrimination of Conifer Height, Age, and Crown Closure Classes Using Landsat-5 TM Imagery in the Canadian Northwest Territories," International Journal of Remote Sensing 24(9):1823-1834, May 2003.
Franklin, S.E. et al., "Texture Analysis of IKONOS Panchromatic Data for Douglas-Fir Forest Age Class Separability in British Columbia," International Journal of Remote Sensing 22(13):2627-2632, 2001.
Liu, W., et al., "Predicting Forest Successional Stages Using Multitemporal Landsat Imagery With Forest Inventory and Analysis Data," International Journal of Remote Sensing 29(13):3855-3872, Jul. 2008.

(Continued)

*Primary Examiner* — Jingge Wu
(74) *Attorney, Agent, or Firm* — Perkins Coie LLP

(57) ABSTRACT

A false color composite image is created by assigning mid infrared data from three time-spaced images of an area of interest to corresponding RGB color components for the false color composite image. The RGB color components for the false color composite image are then converted into color space data and classified into a number of color classes. An age is assigned to the color classes to create a classified image of age classes of the area of interest.

13 Claims, 4 Drawing Sheets

OTHER PUBLICATIONS

Nelson, T., et al., "Spatial Statistical Techniques for Aggregating Point Objects Extracted From High Spatial Resolution Remotely Sensed Imagery," Journal of Geographical Systems 4(4):423-433, Dec. 2002.

Skidmore et al "Use of remote sensing and GIS for sustainable land management." In ITC Jornal No. 3-4, pp. 302-315, published 1997 [online] [retreived Jan. 27, 2010]. Retrieved from the Internet ,URL: http: //144.16.65.194/energy/HC270799/LM/SUSLUP/KeySpeakers/Askidmore.pdf>.

* cited by examiner

AUTOMATIC AGE CLASSIFICATION OF FOREST LANDS

CROSS-REFERENCE TO RELATED APPLICATION

This application is a continuation of U.S. patent application Ser. No. 12/343,930, filed Dec. 24, 2008, the contents of which are incorporated herein by reference.

BACKGROUND

For timberland companies, governments or research institutions, it is often important to be able to accurately classify the ages of trees in a forest without having to physically go and inspect the forest. For example, access to remote forest lands may be difficult or the forest may be so large that it is not cost effective to send crews out to survey the entire site. As a result, satellite or aerial images of the forest are often used to classify the ages of the trees in the forest.

One conventional method of tree age classification using satellite images involves detecting differences in a number of time-spaced images to determine when a forest area is harvested and tracking the corresponding area in a number of the later images to determine how the trees are growing. From the analysis of the changes between images, the age of the trees can be determined. Such a method is both time consuming and requires a certain amount of human insight thereby making it difficult to automate.

Given these problems, there is a need for a system and method for automatically classifying the ages of trees using remotely obtained images in a way that is more efficient and can be automated.

SUMMARY

To address the above problems, the technology disclosed replaces the manual process of tree age classification with a computer system that analyzes images of an area of interest to classify the ages of trees. In one embodiment, three time-spaced images including mid infrared data are loaded into a memory of a computer and used to create a false color composite image of the area of interest. The false color composite image is created by assigning mid infrared data from each of the three images to different RGB color components for the false color composite image. The RGB color components for the false color composite image are then converted into color space data and classified into a number of color classes. Each color class is assigned an age based on coded logic or from a set of data that has previously mapped a color class to a particular age, or range of ages, of trees.

In one embodiment, the mid infrared data from the three images of the area of interest are used for the RGB color components of the false color composite image. In another embodiment, the mid infrared data is mixed with a percentage of near infrared data from the images to create the RGB color components.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed technology will become more readily appreciated as the same become better understood by reference to the following detailed description, when taken in conjunction with the accompanying drawings, wherein.

DETAILED DESCRIPTION

As indicated above, the disclosed technology is directed to a method and apparatus for classifying the ages of trees in an area of interest, such as a forest using remotely sensed images. In the embodiments described in detail below, the remotely sensed images are Landsat images that include image data in six reflective bands including the red, green and blue visible bands, and near and mid infrared bands. However, other remotely obtained images that include mid infrared image data, such as images obtained with other satellite systems, could also be used.

Figure 1:
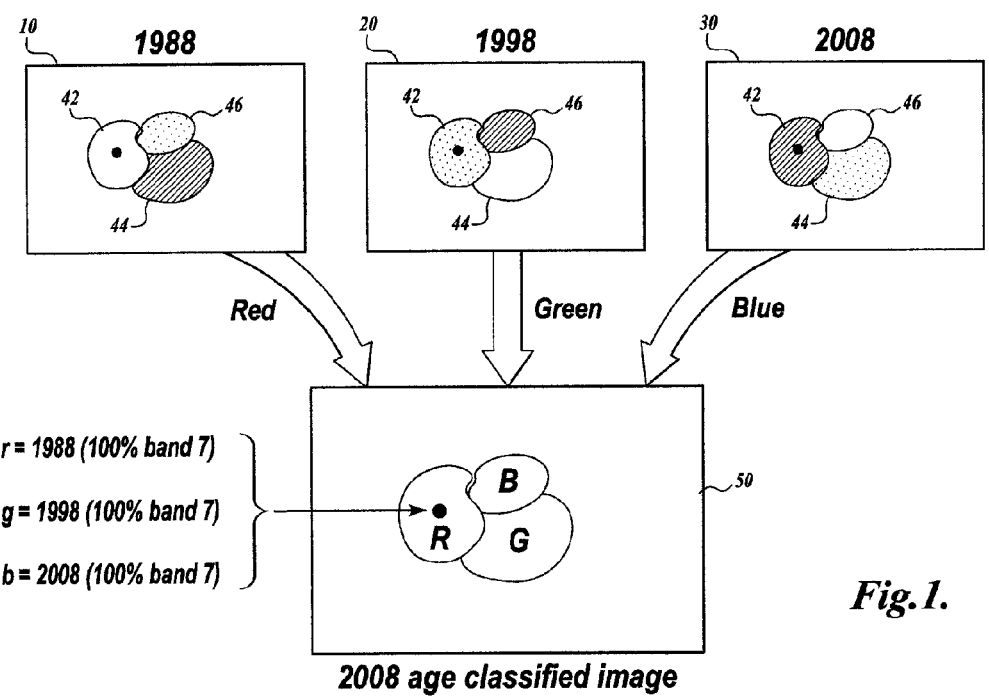
FIG. 1 illustrates a technique for automatically classifying the ages of trees according to one embodiment of the disclosed technology.

As shown in FIG. 1, three images 10, 20, 30 are obtained of an area of interest such a private forest, national forest, state, province etc. The mid infrared data in the images have a brightness that corresponds to the reflectance of photosynthesizing plants or trees in the image. In one embodiment, the images 10, 20, 30 are Landsat images and the mid infrared data are taken from Band 5 and/or Band 7 data (1.55 to 1.75 and 2.08 to 2.35 microns, respectively). In these two spectral bands, actively growing trees appear brighter than those areas that are not growing as quickly. In the first image 10, taken, for example, in 1988, the mid infrared data corresponding to an area of trees 42 appear bright, indicating a recently harvested area or an area of young, actively growing trees. The mid infrared data that correspond to a second area of trees 44 appear less bright, indicating older trees, and the mid infrared data that correspond to a third area of trees 46 are darker yet, indicating still older trees. In the second image 20 taken, for example, in 1998, the mid infrared data that correspond to the second area of trees 44 are now bright, indicating that the trees in this area have been harvested in the time between when the first and the second images were taken. The mid infrared data that correspond to the third area of trees 46 are now the darkest in the image, indicating that this area has the oldest tees in the image.

In the third image 30, taken, for example, in 2008, the mid infrared data that correspond to the area of trees 46 are now the brightest, indicating that the trees in this area were harvested sometime between when the second image 20 was obtained and when the third image 30 was obtained. The mid infrared data that correspond to the first area of trees 42 are now the darkest in the third image 30, indicating that the trees that were young in the first image 10 are now the oldest in the third image 30.

To automatically classify the ages of the trees in the area of interest, a false color composite image is created where the ages of the classified trees are shown in different colors. It is conventional in age-classified images of trees to show the oldest trees in red, the middle age trees in green, and newly planted trees or harvested areas in blue. However other color assignments could be used if desired.

To classify the ages of the trees, the disclosed technology takes advantage of the fact that colors in the false color composite image and tree ages exhibit a stable relationship, provided that the false color composite image is created with mid infrared data from the time-spaced images.

To create a false color composite image, mid infrared data from each of the three images 10, 20 and 30 are used for the red, green, and blue (RGB) color components for the false color composite image 50. If the oldest trees in the false color composite image are to be shown in red, then the mid infrared data from the first image 10 are used for the red color components in the false color composite image. The mid infrared data from the second image 20 are used for the green color components in the false color composite image, and the mid infrared data from the third image 30 are used for the blue color components in the false color composite image. In the example shown, 100% of the mid infrared Band 7 data from the first image 10 is used for the red color components, 100% of the mid infrared Band 7 data from the second image 20 is used for the green color components, and 100% of the mid infrared Band 7 data from the third image 30 is used for the blue color components. The resulting false color composite image 50 shows the trees in later rotation stage in red, trees in the mid-rotation stage in green, and the trees in early rotation stage or harvested areas in blue. Trees that were in later-rotation stage in the 1988 image and are over-mature in the 2008 image are shown in dark gray colors.

To classify the ages of the trees in the area of interest, the various colors shown in the false color composite image 50 are classified or divided into ranges of colors. If 8-bit RGB color component values are used in the false color composite image, then the total number of possible colors in the false color composite image 50 is approximately 16.7 million. To reduce the number of colors in the false color image, the colors in the image are classified. In one embodiment, the RGB color components are first converted into a color space such as HSV or HSG. The HSG color space converts the RGB color components into a polar coordinate color space without distortion.

In the HSG color space, H (hue) is calculated in the same manner as the well known HSV or HSB color spaces. S (saturation) is calculated as $S=(r^2+g^2+b^2-G^2)^{0.5}$ and G (grayscale) is calculated as $G=(r+g+b)/sqrt(3)$, where r, g, and b are the values of the color components of the pixels in the false color composite image. In one embodiment, the RGB color components of the false color composite image 50 may be contrast-enhanced prior to display according to techniques well known to those of ordinary skill in the art of computer imaging. The contrast-enhanced RGB data are then converted into the color space data and then classified.

Commercial software such as Erdas™ available from Leica Geosystems or a similar classification program can classify pixels in the false color composite image into number of spectral classes. The Erdas program or other software converts the RGB components of the pixels in the false color composite image into a color space and allows a user to specify the desired number of color classes and/or the minimum number of pixels assigned to any class. The software combines pixels in color classes that do not have more than a desired number of pixels into other color classes.

Once classified, the color classes of the false color composite image are assigned an age or range of ages of trees (e.g. 0-5, 5-10, 10-15, 15-20, 20-25, 25-30, 30-35 and 35+ yrs.). As indicated above, bands from satellite images such as Landsat Thematic Mapper (TM) have different sensitivities to various land cover types. Short Wave Infrared (SWIR or mid infrared) bands provide less variation within a land cover type than Near Infrared (NIR) band, while mid infrared bands provide enough variations to distinguish major land cover types.

When each mid infrared band from three time-spaced images is used to make a new RGB false color composite image, a group of colors related to forest age classes are observed on a color monitor. For example, the mid infrared band data from the images acquired in year 2008, 1998, and 1988 can be used to create a new false color composite image by assigning 2008 mid infrared band data to the blue color components, the 1998 mid infrared band data to the green color components and the 1988 mid infrared band data to the red color components for display on a color monitor.

Non-timberland areas will have various bright colors, perennial water bodies will have dark black colors, forest will be displayed as blue colors for trees in early rotation, green colors for trees in mid-rotation, and red colors for trees in later rotation. Forest trees that are older than 30 years will have dark black colors for conifers and gray colors for hardwoods.

As long the image acquisition dates are known, the mid infrared false color composite image made from three images will show a consistent relationship between colors and forest age classes. With above color/band/date combination, a forest in early-rotation will always be displayed as various blue colors, a forest in mid-rotation will be displayed as various green colors, forests in late-rotation will be displayed as various red colors, and mature forest will be dark or gray based on their forest types.

Because this relationship of color and forest age classes is consistent for the composite of mid infrared bands of Landsat multi-temporal TM images, an automated forest age classification is possible. As long as the image acquisition dates are known, a scheme of age classes and colors are made for an accurate forest age classification. An age class can be predicted by knowing a color on the false color composite image.

Human eyes cannot make precise color recognition for the same RGB colors; it depends on a person's mood, environment, adjacent colors, preference of colors, or definition of colors by each individual. Furthermore, the color recognition may be changed from person to person or from time to time. However, the digital numbers of RGB colors for display on the color screen do not change with time or computer. If a color model (Hue, Saturation, and Brightness or Grayscale) is used and a computer determines the color definition on the false color composite image, there will be a consistent and automated color recognition. The computer can then assign each color a code for a forest age class based on the scheme of age classes and colors.

In one embodiment using a color model for the above example, all colors with brightness values greater than a threshold (e.g. >80% of highest brightness) are classified as non-timberlands; all colors with saturation less than a threshold value (e.g. <10% of highest saturation) are classified as mature forests; bright blue colors are for 5-year-old forests; and dark blue colors are for 10-year-old forests. The same interpretation applies for forests with green and red colors i.e. bright green areas represent trees 10-15 years old, dark green area represent trees 15-20 years old, while bright red areas represent trees 20-25 years old and dark red areas represent trees 25-30 years old. The particular range of tree ages depends on the time between when the images were obtained. For example, if images are obtained in 2008 and 1993, then dark blue areas in the false color composite image represent trees up to 15 years old, etc. The determination of what constitutes a bright color from a dark color can be made by analyzing the brightness of a color pixel in the false color composite image. In one embodiment where brightness can vary between 0-100, the brightness range is divided into two parts, e.g. 0-49 and 50-100, to define dark and bright colors.

In some situations, mid infrared data of a Landsat image does not distinguish between trees of close ages. Therefore in the embodiment shown in FIG. 2, the false color composite image is created by combining mid infrared data with some portion near infrared data, such as Landsat Band 4 data. Landsat Band 4 data is very sensitive to photosynthesis and can therefore differentiate between trees growing at slightly different rates. However, if used alone, the data in this near infrared band introduces too much variation into the false color composite image. The level of near infrared data is generally increased with time between images in order to provide a desired level of variation. In general, it is desirable to create a false color composite image using a majority of mid infrared data and a minority of near infrared data to achieve a desired level of variation.

Figure 2:
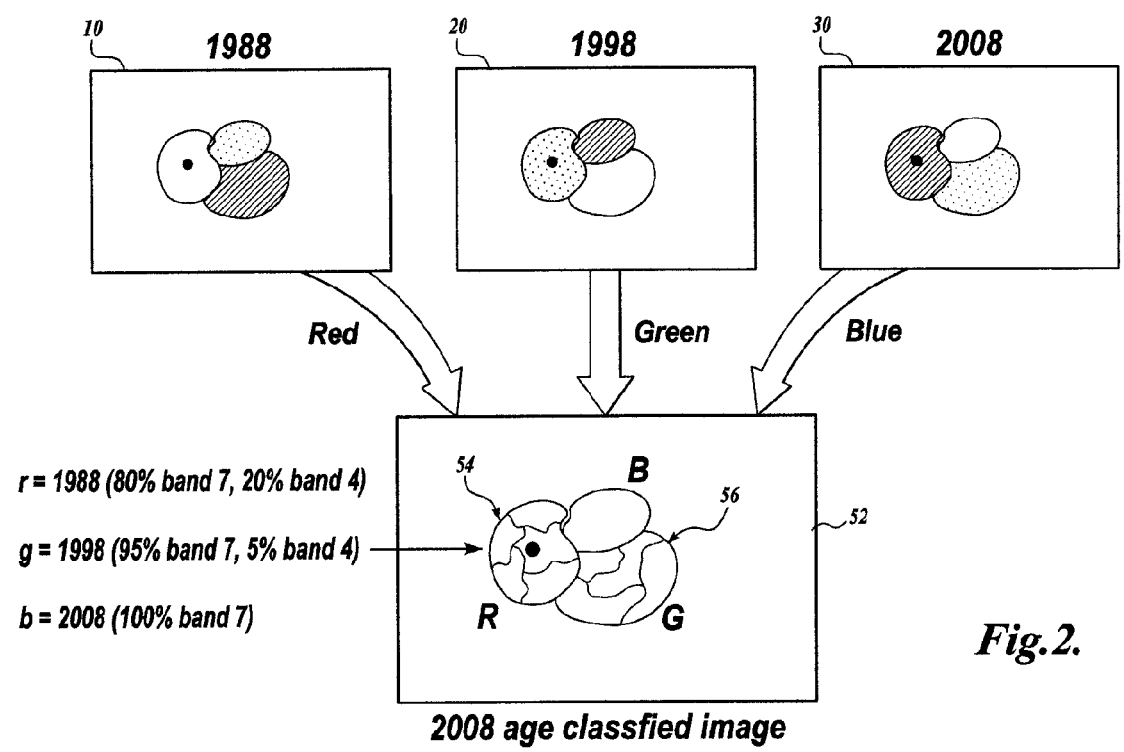
FIG. 2 illustrates a technique for automatically classifying the ages of trees according to another embodiment of the disclosed technology.

In the embodiment shown in FIG. 2, the red color components of the false color composite image 52 are created using 80% Band 7 data and 20% Band 4 data from the first image 10. The data for the green color components are created using 95% Band 7 data and 5% Band 4 data. The data for the blue color components in the false color composite image 52 are created using 100% Band 7 data from the third image 30. As shown, the false color image has a number of differently colored red regions 54 and a number of differently colored green regions 56 as a result of mixing in some of the Band 4 Landsat image data with the Band 7 Landsat image data. Each of the differently colored regions allows finer distinctions of tree age to be made.

In another embodiment, the mid infrared data from Band 5 of a Landsat image also produces good results when used instead of, or mixed with, the Band 7 data. The particular mix of mid and near infrared data may be adjusted according to the level of differentiation desired and spectral ranges that are imaged.

Figure 3:
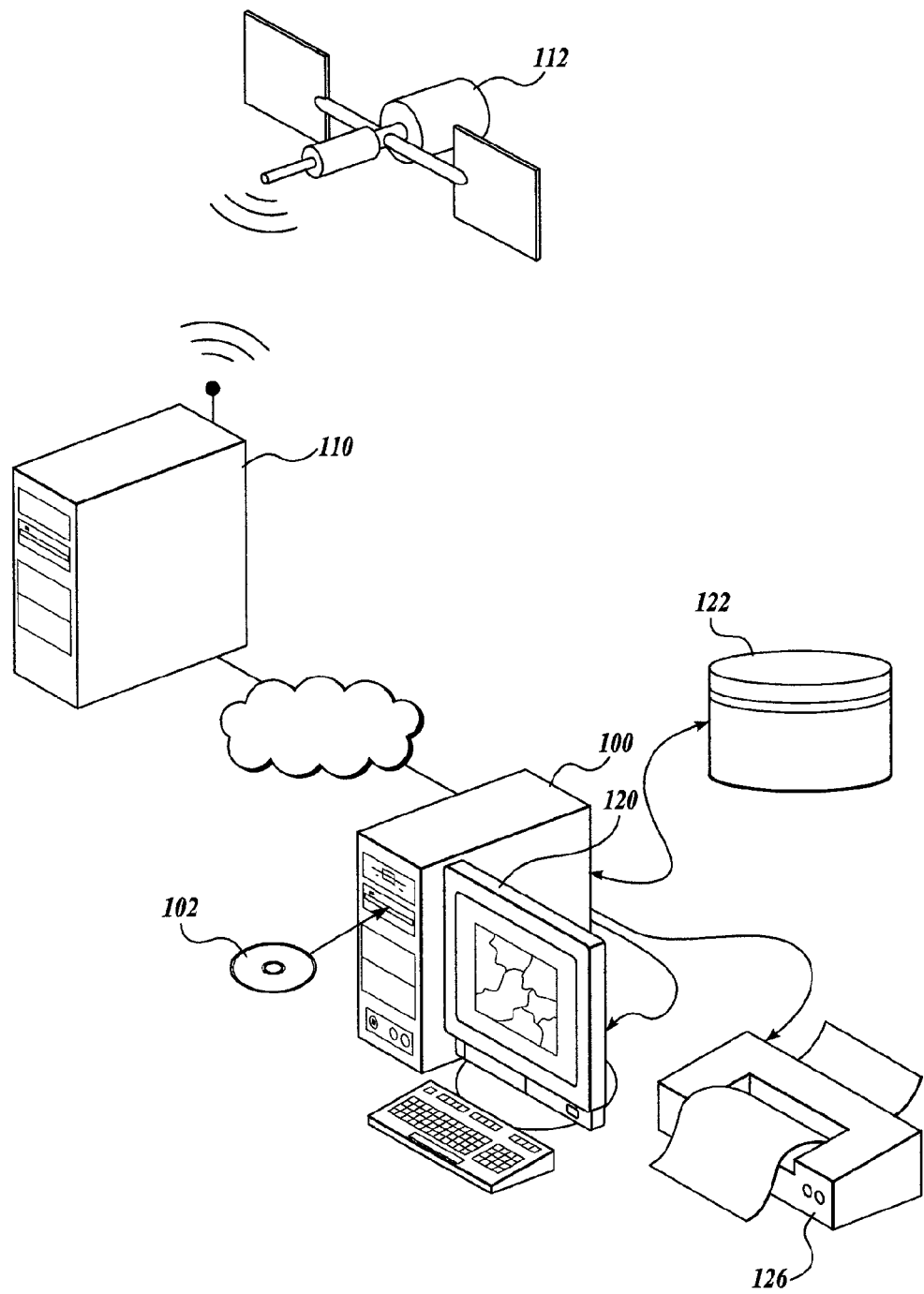
FIG. 3 illustrates a block diagram of a suitable computer system for carrying out the embodiments of the disclosed technology.

FIG. 3 illustrates a suitable computer system for classifying the ages of trees from remotely sensed images of an area of interest. A computer 100 executes a series of instructions contained on a computer storage medium, such as a CD 102, DVD, hard disk, memory stick etc., or downloaded from remote computer system. The computer system 100 loads at least three images of the area of interest into a memory. The images may be obtained by a satellite system 112 and stored on a remote computer 110 for purchase. The images can be downloaded over the Internet or stored on a computer readable medium, such as a CD or DVD, etc.

The computer system 100 creates a classified image of age classes for display on a monitor 120. In addition or alternatively, the computer 100 stores the classified image of age classes on a computer readable storage device, e.g. hard drive 122, for later analysis or sends the classified image of age classes to a printer 126. The classified image of age classes may also be transmitted to a remote location via a wired or wireless communication link.

Figure 4:
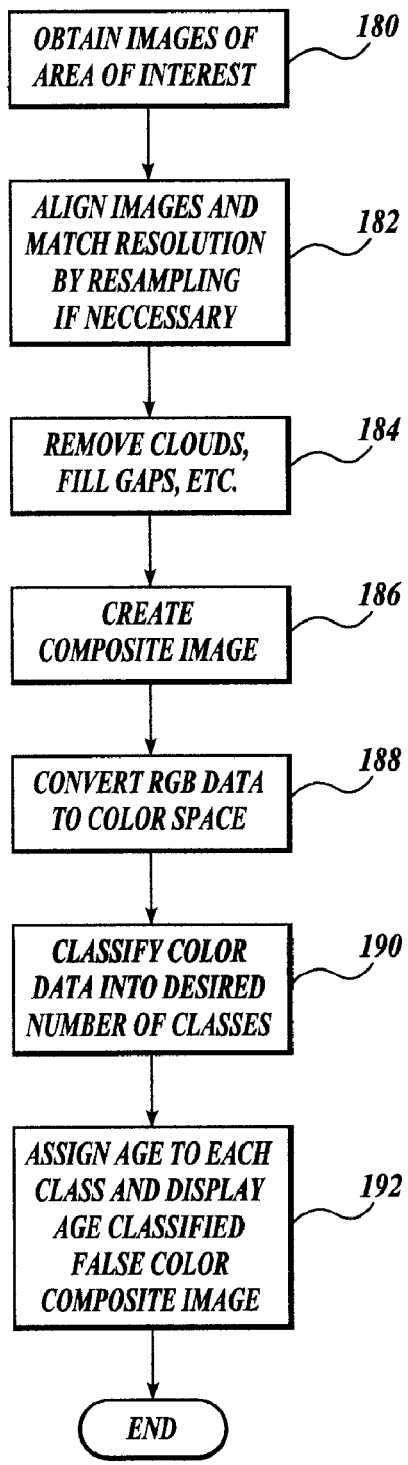
FIG. 4 is a flowchart showing steps performed by a computer system to automatically classify the ages of trees in accordance with embodiments of the disclosed technology.

FIG. 4 illustrates a series of steps performed by the computer system 100 to classify the ages of trees in an image in accordance with an embodiment of the disclosed technology. Although the steps are shown and described in particular order, it will be appreciated by those of ordinary skill in the art that the order may be changed or different steps performed in order to achieve the functionality described.

At 180, the remotely sensed images of the area of interest are obtained. The images may be previously stored and read from a memory or read from a computer-readable media. Alternatively, the images may be downloaded from a commercial or government Web site. In one embodiment, the images are Landsat images, but other images that contain data in the spectral ranges equivalent to a mid infrared Band 7 (2.08-2.35 microns) or Band 5 (1.55-1.77 microns) and a near infrared Band 4 (0.76-0.90 microns) of the Landsat images could be used.

At 182, the three images are prepared by aligning them so that the same pixel in each image represents the same physical location in the area of interest. If the images have different resolutions, the resolutions are made the same by re-sampling, if necessary. At 184, any image gaps are filled and obscuring features, such as popcorn clouds, are removed. In one embodiment of the invention, any gaps are filled and clouds are removed using the techniques described in U.S. patent application Ser. No. 12/197,164, filed Aug. 22, 2008, which is herein incorporate by reference in its entirety. Briefly summarized, the techniques described in the '164 patent application fill in the gaps or replace obscured image data in a target image with data from a second source image of the same area where the pixels of both the target and source image are classified into a number of color classes. The colors of the pixels that are obtained from the source image to replace the missing or obscured pixels in the target image are scaled depending on a comparison of the average or mean values for the pixels in a corresponding color class of pixels in the target and source images. The scaling can help compensate for varying lighting conditions or time of year variations between the source and target images.

At 186, the false color composite image is created from the three images as described above. A user viewing the false color composite image may accept the false color composite image or vary an amount of near infrared data used to create the false color image depending on how much variation appears in the various color regions. If more variation is desired in the green regions for example, a greater percentage of near infrared data from the image used for the green color components in the false color composite image can be mixed with the mid infrared data. Alternatively, a computer can determine the number of variations, i.e. the number of color classes and make adjustments by controlling a mix of near and mid infrared data accordingly. Once the number of variations shown in the false color composite image is satisfactory, the RGB color components for the false color composite image (which may have been contrast enhanced or otherwise modified for display) are converted into a color coordinate space such as HSG, HSV or HSB.

At 190, the color space data is classified and at 192, each classified color is assigned an age after identifying non-forest regions and mature trees as described above.

While illustrative embodiments have been illustrated and described, it will be appreciated that various changes can be made therein without departing from the scope of the invention. Therefore the scope of the invention is to be determined from the following claims and equivalents thereof.

The invention claimed is:

1. A computer system for classifying the ages of trees in an area of interest, comprising:
   a processor that is configured to execute a series of program instructions to cause the processor to:
   create a false color composite image by using mid-infrared data from three images for the area of interest that are each taken at different times as RGB color components for the false color composite image;
   convert the RGB color components of the false color composite image into color space data defining colors in the false color composite image;

classify the colors in the false color composite image into a number of color classes;

determine if a desired number of color classes are present for the areas in the false color composite image that represent trees and if not, adding an amount of near infrared data from an image of the area of interest to an RGB color component for the false color composite image to increase the number of color classes; and assign an age to the color classes to produce an image of tree ages within the area of interest.

2. The computer system of claim 1, wherein the processor is configured to execute program instructions to store the image of tree ages on a computer storage media.

3. The computer system of claim 1, wherein the processor is configured to execute program instructions to display the image of tree ages on a computer display.

4. The computer system of claim 1, wherein the combination of infrared data for one or more of the RGB color components of the false color composite image is a majority of mid-infrared data and a minority of near infrared data from an image of the area of interest.

5. A method executed by a computer system to classify ages of trees in an area of interest, comprising:

storing three time-spaced images having infrared data of an area of interest in a memory of the computer;

creating a false color composite image of the area of interest by assigning mid-infrared data from the images to RGB color components of the false color composite image;

converting the RGB color components into color space data defining colors of the false color composite image;

classifying the color space data to define a number of color classes;

adding an amount of near infrared data from an image of the area of interest to the mid-infrared data used as an RGB color component of the false color composite image to increase the number of color classes for areas in the false color composite image that represent trees; and assigning the color classes to an age of trees.

6. The method of claim 5, further comprising displaying an image of tree ages on a computer monitor.

7. The method of claim 6, further comprising transmitting the image of tree ages to a remote computer.

8. The method of claim 5, wherein the RGB color components of the false color composite image include a majority of mid-infrared data.

9. The method of claim 5, wherein each color class has a range of brightness values and wherein each color class having brightness values greater than 80% of a maximum brightness value is classified as a non-timber area in an image of tree ages.

10. The method of claim 5, wherein each color class has a range of saturation values and wherein each color class having saturation values less than 10% of a maximum saturation value is classified as a mature forest area in the image of tree ages.

11. A non-transitory computer storage media including a number of instructions stored thereon that are executable by a computer to perform a method of classifying the ages of trees in an area of interest, by:

storing three time-spaced images having infrared data of an area of interest in a memory of the computer;

creating a false color composite image of the area of interest by assigning mid-infrared data from the images to RGB color components of the false color composite image;

converting the RGB color components into color space data defining colors of the false color composite image;

classifying the color space data to define a number of color classes;

adding an amount of near infrared data from an image of the area of interest to the mid-infrared data used as an RGB color component of the false color composite image to increase the number of color classes representing trees in the area of interest; and assigning ages of the trees to the color classes.

12. A computer system for classifying the ages of trees in an area of interest, comprising:

a processor that is configured to execute a series of program instructions to cause the processor to:

create a false color composite image by using mid-infrared data from three images for the area of interest that are each taken at different times as RGB color components for the false color composite image;

convert the RGB color components of the false color composite image into color space data defining colors in the false color composite image;

classify the colors in the false color composite image into a number of color classes; and assign an age of the trees within the area of interest to the color classes.

13. A non-transitory, computer readable medium having instructions stored thereon that are executable by a computer system to:

create a false color composite image by using mid-infrared data from three images for an area of interest that are each taken at different times as RGB color components for the false color composite image;

convert the RGB color components of the false color composite image into color space data defining colors in the false color composite image;

classify the colors in the false color composite image into a number of color classes; and assign an age of the trees within the area of interest to the color classes.

* * * * *